United States Patent Office 3,052,552
Patented Sept. 4, 1962

3,052,552
PRINTING ON CONFECTION ITEMS AND THE RESULTING PRODUCT
Howard Koerner, Voorheesville, and Frank Witzel and Willis Barshied, Canajoharie, N.Y., assignors to Beech-Nut Life Savers, Inc., Canajoharie, N.Y., a corporation of New York
No Drawing. Filed Sept. 16, 1959, Ser. No. 840,240
20 Claims. (Cl. 99—148)

The instant invention relates to methods of printing on confection items as well as to inks which make such printing methods practical and feasible. Extreme difficulty has been encountered in attempts to print on a mobile sugared surface of a confection item moving at production speeds. Bleeding, smudging and offset have been prime considerations.

It is a purpose of this invention to devise methods of printing on the surface of confection items in general and chewing gum in particular. It is a further purpose that said methods be applicable to existing high-speed confection production equipment with a minimum of modification of said equipment. More particularly, it is a purpose of this invention to print on a mobile sugared surface of a confection which is moving at production speeds without excess bleeding, smudging and offset.

It is a further purpose of this invention to provide edible inks which will print on a mobile sugared surface of a confection item which is moving at production speeds without considerable bleeding, smudging and offset. It is still a further purpose of this invention that said inks dry at a sufficient rate of speed so that neither the length nor the speed of the production line will have to be altered.

The difficulties involved with printing on confection items can be illustrated by those encountered with chewing gum.

The chewing gum industry has been consistently faced with the problem of producing chewing gum with no decrease in size or weight and no increase in price in spite of rising costs for raw materials, labor, etc. In order to meet this extreme challenge, faster and more efficient production methods have been devised. Efficient chewing gum production techniques, dictated by industry economy, result in many technical difficulties related to drying time, definition, and uniformity of design when surface printing is attempted.

Chewing gum, traveling at a rate of 68 to 100 feet per minute, must be dry in a fraction of a second (0.5 to 0.8 second) after leaving the printing area. If drying is not complete, severe offset problems occur due to the automatic "stacking" of gum immediately following the printing operation.

Further, since conservation of space is a prime requisite of an efficient production method, the printing operation is accomplished on a standard "breaking machine." This machine automatically discharges from a cartridge slabs of gum 2.86 inches wide and 16.5 inches long at a speed of 270 slabs per minute to a series of cutting knives which cut each slab into 22 sticks, each 0.75 inch wide, and automatically "stacks" the sticks in a holding tray. The printing operation is accomplished between the automatic cartridge which discharges the slabs and the cutting knives. Obviously, the printing rolls must be geared to this high speed operation and still print with maximum definition and complete coverage on gum surface containing a considerable amount of loose dusting sugar (approximately 10% by weight of the gum).

Other confection items to which the instant invention can be applied are bubble gum, sugar wafers, nougats, toffees and other chewy sweets, pressed mints and clear hard candies.

The term confection item applies to sweet products, commonly called candy, composed principally of sugars, confectioner's glucose and flavoring material. Only those items having sufficient body to withstand distortion during the printing process are included in this invention.

Any one of the three principal printing methods, i.e. relief printing, offset printing and gravure printing, can be employed in accord with the instant invention. These methods are described in the Ninth Graphic Arts Production Yearbook, Colton Press, New York, 1950, page 408, in an article by F. W. Adonis, "Process Comparator."

Chewing gum, in a form receptive to printing moves through a production line travelling at a rate of approximately 100 feet per minute. With a minimum modification of production equipment, e.g. neither increasing the length of travel nor reducing the rate of travel, the printed surface has a maximum drying time of one second. Two distinct types of inks have been developed which satisfy the strict requirements of confection printing in general and chewing gum printing in particular.

Adsorption inks, consisting of (a) an edible dye material, (b) a carrying medium, (c) a binder, and (d) a wetting agent, dry by the adsorption of the carrying medium into the confection item.

The dye material must be an acceptable edible substance which is either water-soluble, oil-soluble or non-soluble. Non-soluble dyes can be employed since the dye need not form a solution with the carrying medium. Although water-soluble dyes can be used with the same techniques and formulations as other dyes, the print has the disadvantage of coloring the consumer's mouth. Examples of water-soluble dyes are:

(1) FD & C Red No. 4 (Ponceau SX)—disodium salt of 2-(5-sulfo-2,4-xylylazo)-1-naphthol-4-sulfonic acid.
(2) FD & C Yellow No. 5 (Tartrazine)—trisodium salt of 3 carboxy-5-hydroxy-1-p-sulfophenyl-4-p-sulfophenylazo-pyrazole.
(3) FD & C Green No. 1 (Guinea Green B)—monosodium salt or 4-[4-(N-ethyl-p-sulfobenzylamino)diphenyl - methylene] - [1 - (N - ethyl - N - p - sulfonium-benzyl)-Δ2,5-cyclohexadienimine].
(4) FD & C Blue No. 1 (Brilliant Blue)—disodium salt of 4 - {[4 - (N - ethyl - p - sulfobenzylamino)-phenyl] - 2 - sulfoniumphenyl) - methylene} - [1 - N-ethyl-N-p-sulfobenzyl)-Δ2,5-cyclohexadienimine].

Among the contemplated oil-soluble dyes are:

(1) Oil soluble oleoresin of paprika having a color value of 40,000 units. Color values of 80,000 or 120,000 units, or mixtures thereof may also be used.
(2) Oil soluble annatto:
   (a) Annatto Food Color No. 2, manufactured by the Marschall Dairy Laboratory of Madison, Wisconsin
   (b) Annatto Margarine Blend No. 2
   (c) Annatto Food Colors No. 1, No. 3 and No. 5

Oil soluble annatto is the acetone extractable material of the annatto seed chemically known as bixin. "Annatto" is defined in "The Merck Index" [Merck & Co., Inc., Rahway, N.J., sixth edition, 1952, page 81, column 1] as: "Arnotta; annotta. Coloring matter from seeds of Bixa orellana. Soluble in alcohol, ether, oils." The structural formula of bixin as set forth in "The Chemistry of Synthetic Dyes," by K. Venkataraman [Academic Press Inc., New York, N.Y., volume II, 1952, page 1277] is:

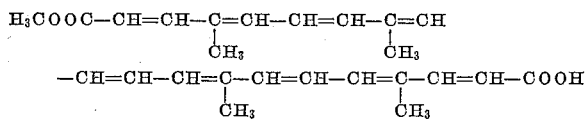

A specific example of an annatto composition contemplated for use in the instant invention is that produced by Example 2 of United States Patent No. 2,831,775. The annatto composition of Example 1 of the same patent can also be employed.

Lake dyes are examples of insoluble dyes. These dyes correspond, in general, to the water-soluble dyes except for a substratum of either alumina or calcium carbonate. Dyes having an alumina substratum are preferred. The concentration of these dyes in typical ink formulations is the same as that for water-soluble dyes. Exemplary lake dyes are:

(1) FD & C Red 4 Alumina Lake
(2) FD & C Yellow 5 Alumina Lake
(3) FD & C Green 1 Alumina Lake
(4) FD & C Blue 1 Alumina Lake In the formulation of inks within the scope of the instant invention, the use of any one or combination of water-soluble FD & C dyes is contemplated. Said dyes include:

(a) FD & C Red No. 2
    FD & C Red No. 3
    FD & C Red No. 4
(b) FD & C Yellow No. 1
    FD & C Yellow No. 3
    FD & C Yellow No. 4
    FD & C Yellow No. 5
    FD & C Yellow No. 6
(c) FD & C Green No. 1
    FD & C Green No. 2
    FD & C Green No. 3
(d) FD & C Blue No. 1
    FD & C Blue No. 2
(e) FD & C Violet No. 1

Any approved edible "lake" obtained from the above-noted or other dyes or mixtures thereof, said "lake" having alumina, calcium carbonate or any other acceptable edible substratum, can naturally be employed.

The use of any of the approved FD & C dyes or lakes is contemplated in the instant inventive process. Such dyes and lakes are indicated, e.g., in the Federal Register of May 14, 1959; 24 F.R. 3851; Title 21—Food and Drugs, chapter 1, part 9, pages 1 to 9.

The carrying medium comprises flavoring oils, which include all natural, essential and synthetic flavoring oils considered to be edible and accepted by the Food and Drug Administration. In the case of chewing gum a fruit flavoring oil is the preferred carrying medium.

In the event an oil is readily oxidizable, e.g. peppermint oil and spearmint oil, standard confectioner's shellac must be resorted to as a combination of vehicle and binder. Shellac glazes are made from the purest bleached shellacs and pure alcohols approved by the U.S. Government. These glazes are commercially available in pound cuts ranging from two pounds to eight pounds. The solid content of the various cuts is represented in Table I.

TABLE I

| Pound cut: | Min. solids (percent by wt.) |
|---|---|
| 2 | 22.7 |
| 2.5 | 26.8 |
| 3 | 30.5 |
| 3.5 | 34.0 |
| 4 | 37.0 |
| 4.5 | 39.8 |
| 5 | 42.3 |
| 6 | 46.8 |
| 7 | 50.6 |
| 8 | 54.0 |

Although any pound cut can be used by diluting with alcohol those cuts with higher shellac solids, the use of the two-pound cut is preferred.

A resin binder is used in the ink formulation to increase and improve definition of design. Without a resinous binder the ink has a tendency to diffuse through the sugar crystals on the surface of the sugared confection item, e.g. chewing gum, causing ragged edges.

When inks are prepared for printing on chewing gum, the preferred binder is polyvinyl acetate. This resin has been used for years in chewing gum and therefore is not subject to the provisions of the Food Additives Amendment. Any resin, however, which is edible and is soluble in the flavoring vehicle can be used as binder. Typical resin binders are:

(1) Ester gum
(2) Polymethyl acrylate
(3) Polyethyl acrylate
(4) Coumarone-indene
(5) Parco resin (a low molecular weight natural fossil aliphatic hydrocarbon resin available commercially from Utah coal seams)

The preferred polyvinyl acetate has a molecular weight of from 2400 to 2500, an acid number less than 1 and a saponification number of about 638. However, it is possible to use resins as noted above ranging in molecular weight from 2000 up to high molecular weight emulsion polymers of 25,000. The only criteria which would make a resin not acceptable would be extensive cross linking which would make the resin less oil soluble and result in gelation difficulties. As a rule, the higher the molecular weight of the resin, the lower the concentration of the resin in the ink formulation.

A phosphatide, essentially the same as those listed in United States Patent No. 2,197,719 to Herbert W. Conner, may be used as the wetting agent. A commercial-type lecithin of the soya bean type with soya oil as carrier is preferred. The use of lecithin to enable the printing ink to wet the dusting sugar of the confection item provides the solution of the problem encountered when high spots of sugar appear on the surface of e.g. chewing gum moving through printing rolls at a rate of 270 slabs (each 2⅞ inches wide) per minute. The use of the lecithin has nothing to do with the distribution of the pigment in the dye vehicle. The dye is under continuous agitation during the printing process and, therefore, does not settle. It further has been subjected to treatment with a colloid mill (also called a homomixer). Any standard colloid mill, homomixer or homogenizer can be employed for this purpose.

A general formulation for an adsorption ink according to the instant invention is as follows:

| Ingredient: | Per cent by weight |
|---|---|
| Dye | 15 to 40 |
| Fruit flavoring oil (carrying medium) | 72 to 56 |
| Resin binder | 12 to 3 |
| Lecithin | 1 |

Adsorption inks within the immediate contemplation of the instant invention dry in about 0.5 second at a temperature of 22° C.

Also within the scope of the instant invention are inks, consisting of (a) an edible dye material, (b) a carrying medium, (c) a binder and (d) a wetting agent, which dry by the evaporation of the carrying medium. The ingredients of these inks are the same as noted above for adsorption inks except that the carrying medium is a low boiling solvent, e.g. ethyl alcohol, for the binder which is confectioner's shellac glaze.

With the use of an ink which dries by the evaporation of the carrying medium, a period of either natural or heated air drying is required.

Gum traveling at approximately 68 to 100 feet per minute requires 1 second of drying time at surface temperatures of 80° C. to 110° C. This, of course, is dependent on the speed of gum, the rate of drying, and the heat transfer properties of the gum; the latter being important so that the gum will not lose its shape when stacked.

Chewing gum is an example of a confection item upon which the above-described inks can be used for printing.

Although it is possible to print on practically any gum, the speed of drying (by adsorption) of the ink is dependent to a large extent on the porosity of the gum. For example, a gum into which more air has been incorporated, having a density of 1.15, will absorb the dye more effectively than a gum having less air and a density of 1.40. Also fresh gum will absorb the ink more readily than gum which has aged and formed somewhat of a skin.

In the practice of the instant invention, the use of chewing gum having a density from 1.15 to 1.40, preferably in the range from about 1.25 to about 1.35, is contemplated. Ordinarily chewing gum has a fruit flavor, and the printed matter corresponds in color to the fruit flavor. For example: an orange flavored gum has orange printing; lime gum has green printing; and lemon gum has yellow printing. This need not be the color scheme employed; such is merely illustrative. In fact there need be no correlation between the color of the printing and the flavor of the gum.

A suitable chewing gum formulation is that found in United States Patent No. 2,323,102 to Milfred Lawson Staples.

CHEWING GUM COMPOSITION

Ingredient: Per cent by weight
Gum base_____ 15 to 25
Sucrose _____ 50 to 60
Glucose _____ 15 to 25
Softeners of fillers_____ 1 to 5
Flavoring—a fraction of 1% and a thin coating of dusting sugar.

In the foregoing composition the gum base may be one of those indicated in United States Patent No. 2,197,719 to Herbert W. Conner.

*Base I*

Ester gum _____ 88
Rubber latex solids_____ 10
Commercial soya bean lecithin_____ 2

*Base II*

Chicle _____ 30
Jelutong _____ 60
Gutta soh_____ 8.5
Commercial soya bean lecithin_____ 2

*Base III*

Partially oxidized chicle_____ 98
Commercial soya bean lecithin_____ 2

*Base IV*

Jelutong (dry)_____ 80
Gutta siak_____ 18
Commercial soya bean lecithin_____ 2

According to the instant invention, inks are prepared by dissolving at a temperature in the range of 50° to 80° C. from about 3 to about 12 parts by weight of a resin binder, e.g. polyvinyl acetate (molecular weight 2400), in from about 56 to about 72 parts by weight of a flavoring oil, e.g. a fruit flavor comprising a mixture of esters, aldehydes, ketones and acids, with 1 part of lecithin, e.g. commercial soya bean lecithin. After complete solution, from 15 to 40 parts by weight of dye are added to and thoroughly dispersed in the solution by means of a colloid mill. The contemplated inks result. The foregoing parts by weight are based on 100 parts by weight of ink. The resin may be any edible oil soluble resin, e.g. ester gum, polymethyl acrylate, polyethyl acrylate, cumarone indene, or shellac. The dye may be any FD & C approved water- or oil-soluble or lake dye, or a natural vegetable dye, such as annatto-turmeric, carotene, paprika, etc.

After thorough homogenization, the resulting ink is placed in a reservoir and is kept in suspension by continuous circulation from a sugar settling tank with a pump. The sugar settling tank is necessary in order to avoid a build up of sugar (from the gum surface) in the ink reservoir.

Gum slabs measuring 2.86 inches wide and 16.5 inches long are automatically conveyed to the printing rolls at a rate of 270 slabs per minute. After printing, the slabs are cut into sticks and are automatically "stacked" for wrapping. The printing may be any conventional type of printing such as relief, offset or gravure.

If the method of drying is by evaporation, the gum must pass through a heated air tunnel (for approximately one second) having a temperature of 80° C. to 110° C. All printing is done at about 22° C. and atmospheric pressure.

In the examples which follow, all parts are parts by weight unless otherwise specified.

EXAMPLE I

A chewing gum, having the following general formulation, is prepared in accord with standard techniques.

| | | Parts |
|---|---|---|
| Base_____ | | 20.0 |
|    Ester gum_____ | 16.6 | |
|    Rubber latex solids_____ | 2.0 | |
|    Commercial soya bean lecithin_____ | 0.4 | |
|    N.F. Grade titanium dioxide_____ | 1.0 | |
| Confectioner's glucose_____ | | 20.0 |
| Sucrose_____ | | 60 |
| Flavor_____ | | 1.0 |

Throughout the examples the use of any commercially available artificial fruit flavor is contemplated as "flavor" or "flavoring oil" unless otherwise specified. Either cinnamon or cassia may also be employed. It is noted also that in place of the aforementioned ethyl acetate may be used.

EXAMPLE II(a)

Six parts of polyvinyl acetate (molecular weight 2400) are dissolved in 61 parts of flavoring oil with 1 part of commercial soya bean lecithin at 80° C. After complete solution, 32 parts of FD & C Red 4 Alumina Lake are added to said solution. The lake dye is thoroughly dispersed throughout the solution in a colloid mill (homomixer).

After thorough homogenation, the resulting ink is placed in a reservoir. The dye is kept in suspension by continuous circulation from a sugar settling tank by means of a pump. The sugar settling tank avoids a build up of sugar (from the gum surface) in the ink reservoir.

Slabs of chewing gum (prepared in accord with the formulation of Example I) measuring 2.86 inches wide and 16.5 inches long are conveyed to gravure printing rolls at the rate of 270 slabs per minute. After printing, the slabs are cut into sticks and "stacked" for wrapping. The ink is applied continuously to the rolls during printing.

EXAMPLE II(b)

An ink which dries with the evaporation of the carrying medium follows:

| | Parts |
|---|---|
| FD & C Blue No. 1 Alumina Lake | 32 |
| Standard confectioner's shellac (2-pound cut) | 34 |
| Pure grain alcohol (Formula 35-A of U.S. Internal Revenue Service) | 33 |
| Commercial soya bean lecithin | 1 |

The constituents are mixed in the same manner as set forth in part (a).

EXAMPLE II(c)

In the event an oil is readily oxidizable, e.g. peppermint oil and spearmint oil, standard confectioner's shellac must be resorted to as a combination of vehicle and binder. It is not desirable to print with the flavoring oil as the vehicle in this instance since the flavoring oil would be exposed to the air at the surface of the gum and would quickly oxidize and impart an off flavor to the product. Therefore, the flavoring oil is entirely a part of the gum and no flavor at all is used in the printing operation.

| | Parts |
|---|---|
| FD & C Red No. 4 Alumina Lake | 32 |
| Standard confectioner's shellac (2 lb. cut) | 34 |
| Pure grain alcohol (Formula 35-A of U.S. Internal Revenue Service) | 33 |
| Commercial soya bean lecithin | 1 |

The constituents are mixed in the same manner as set forth in Example II(a).

EXAMPLE II(d)

Using the chewing gum of Example I wherein the flavor is spearmint oil, printing is effected with the following dye:

| | Parts |
|---|---|
| FD & C Green No. 1 Alumina Lake | 32 |
| Standard confectioner's shellac (2 lb. cut) | 34 |
| Pure grain alcohol (Formula 35-A of U.S. Internal Revenue Service) | 33 |
| Commercial soya bean lecithin | 1 |

The constituents are mixed in the same manner as set forth in Example II(a).

The inks set forth in Example II(b to d) are dried by the evaporation of the carrying medium, namely: pure grain alcohol. This drying is accomplished by moving the gum through a heated air tunnel having a temperature of 100° C. The ink is subjected to this temperature for approximately one second. Temperatures from 80° to 110° C. can be employed for drying with the same result.

EXAMPLE III

Formulations of adsorption inks with water-soluble dyes:

A

| | Parts |
|---|---|
| FD & C Red No. 4 (Ponceau SX) | 32 |
| Ethyl acetate (flavoring oil) | 61 |
| Polyvinyl acetate (molecular weight 2400) | 6 |
| Commercial soya bean lecithin | 1 |

B

| | |
|---|---|
| FD & C Yellow No. 5 (Tartrazine) | 32 |
| Ethyl acetate (flavoring oil) | 61 |
| Polyvinyl acetate (molecular weight 2400) | 6 |
| Commercial soya bean lecithin | 1 |

C

| | |
|---|---|
| FD & C Green No. 1 (Guinea Green B) | 32 |
| Ethyl acetate (flavoring oil) | 61 |
| Polyvinyl acetate (molecular weight 2400) | 6 |
| Commercial soya bean lecithin | 1 |

D

| | Parts |
|---|---|
| FD & C Blue No. 1 | 32 |
| Ethyl acetate (flavoring oil) | 61 |
| Polyvinyl acetate (molecular weight 2400) | 6 |
| Commercial soya bean lecithin | 1 |

Water-soluble dyes are more costly than lake dyes since lake dyes contain only about 20 percent dye material. Unfortunately the amount of water-soluble dye employed cannot be correspondingly decreased.

EXAMPLE IV

Formulations of adsorption inks with insoluble dyes:

A

| | Parts |
|---|---|
| FD & C Red No. 4 Alumina Lake | 32 |
| Ethyl acetate (flavoring oil) | 61 |
| Polyvinyl acetate (molecular weight 2400) | 6 |
| Commercial soya beans lecithin | 1 |

B

| | |
|---|---|
| FD & C Yellow No. 5 Calcium Carbonate Lake | 32 |
| Ethyl acetate (flavoring oil) | 61 |
| Polyvinyl acetate (molecular weight 2400) | 6 |
| Commercial soya bean lecithin | 1 |

C

| | |
|---|---|
| FD & C Yellow No. 5 Alumina Lake | 32 |
| Ethyl acetate (flavoring oil) | 61 |
| Polyvinyl acetate (molecular weight 2400) | 6 |
| Commercial soya bean lecithin | 1 |

D

| | |
|---|---|
| FD & C Green No. 1 Alumina Lake | 32 |
| Ethyl acetate (flavoring oil) | 61 |
| Polyvinyl acetate (molecular weight 2400) | 6 |
| Commercial soya bean lecithin | 1 |

E

| | |
|---|---|
| FD & C Blue No. 1 Alumina Lake | 32 |
| Ethyl acetate (flavoring oil) | 61 |
| Polyvinyl acetate (molecular weight 2400) | 6 |
| Commercial soya bean lecithin | 1 |

Formulations for the insoluble dyes may be the same as those for the water-soluble dyes. The substratum may be alumina, calcium carbonate, or other approved edible substratum.

EXAMPLE V

Formulations of adsorption inks with oil-soluble dyes:

A

| | Parts |
|---|---|
| Oil soluble oleoresin of paprika (color value 40,000 units) | 14 |
| Ethyl acetate (flavoring oil) | 60 |
| Polyvinyl acetate (molecular weight 2400) | 25 |
| Commercial soya bean lecithin | 1 |

The oil soluble oleoresin of paprika may also have color values of 80,000 or 120,000, or mixtures thereof.

B

| | |
|---|---|
| Annatto Food Color No. 2 | 14 |
| Ethyl acetate (flavoring oil) | 60 |
| Polyvinyl acetate (molecular weight 2400) | 25 |
| Commercial soya bean lecithin | 1 |

Generally, any oil soluble annatto can be used. For example, Annatto Margarine Blend No. 2 and Annatto Food Colors No. 1, No. 3 and No. 5.

Throughout the preceding examples ethyl acetate was noted (for specificity) as the flavoring oil. It is preferred, however, to use a regular fruit flavor which is a complex mixture of esters, aldehydes, ketones and acids.

It is thought that the invention and its advantages will be understood from the foregoing description, and it is apparent that various changes may be made in the process and composition without departing from the spirit and scope of the invention or sacrificing its material advantages, the process and composition hereinbefore described being merely illustrative of preferred embodiments of the invention.

We claim:

1. In a process for printing on a confection item with an ink, the improvement wherein the ink comprises from 15 to 50 parts by weight of dye, from 56 to 72 parts by weight of carrying medium, from 3 to 12 parts by weight of resin binder, and about 1 part by weight of lecithin, said parts by weight being based on 100 parts by weight of ink.

2. A method which comprises gravure printing on a confection item with an ink which consists essentially of a dye, shellac, pure grain alcohol and a phosphatide wetting agent.

3. A method which comprises gravure printing on chewing gum with an ink which consists essentially of a dye, shellac, pure grain alcohol and a phosphatide wetting agent.

4. A method which comprises gravure printing on fresh chewing gum having a density of about 1.15 with an ink which consists essentially of a dye, shellac, pure grain alcohol and a phosphatide wetting agent.

5. A method which comprises printing on fresh chewing gum having a density of from about 1.15 to about 1.40 with an ink which consists essentially of an edible dye, a carrying medium, a resin binder and a phosphatide wetting agent.

6. A method which comprises printing on fresh chewing gum with an ink which consists essentially of from 15 to 40 parts by weight of an edible dye, from 56 to 72 parts by weight of a flavoring oil, from 3 to 12 parts by weight of resin and about 1 part by weight of lecithin, said parts by weight being based on 100 parts by weight of ink.

7. An edible sorption ink consisting essentially of from 15 to 40 parts by weight of dye, from 56 to 72 parts by weight of fruit flavoring oil, from 3 to 12 parts by weight of resin binder and about 1 part by weight of lecithin, said parts by weight being based on 100 parts by weight of ink.

8. An ink according to claim 7 wherein the dye is water-soluble.

9. An ink according to claim 7 wherein the dye is oil-soluble.

10. An ink according to claim 7 wherein the dye is non-soluble.

11. An ink according to claim 7 wherein the binder is a member selected from the group consisting of polyvinyl acetate, ester gum, polymethyl acrylate, polyethyl acrylate, coumarone-indene, and parco resin.

12. An ink consisting essentially of an edible dye, standard confectioner's shellac, pure grain alcohol, and lecithin.

13. A process which comprises dissolving a resin binder in a carrying medium mixed with a phosphatide wetting agent, thoroughly dispersing an edible dye throughout the resulting solution to form an ink, continually circulating the ink through a separator to maintain the dye in dispersion and to keep the ink free from contamination, and applying the circulating ink to printing rolls which contact the surface of a confection item in the regular production of said confection.

14. In the production of chewing gum, the step wherein the surface of the chewing gum is printed after sugaring and prior to stacking of finished sticks.

15. A fruit flavored chewing gum having a density of from 1.25 to 1.35 and having on its surface discontinuous colored print, the borders of which are well defined.

16. A process which comprises printing fresh sugared chewing gum having a density of about 1.25 with an insoluble lake dye which dries by sorption.

17. In a process for printing on a confection item with an ink, the improvements wherein the confection item is fresh fruit-flavored sugared chewing gum having a density of from about 1.25 to about 1.35, the ink comprises an insoluble lake dye, and said dye is dried by sorption.

18. Sugared chewing gum having a density of from 1.25 to 1.35 having on its surface discontinuous colored print, said print consisting essentially of edible ink the borders of which are well defined.

19. Chewing gum bearing discontinuous colored indicia thereon in direct and intimate contact therewith throughout the entire extent of said indicia.

20. In combination with chewing gum and in intimate contact with the surface thereof discontinuous colored edible print, the borders of which are well defined.

References Cited in the file of this patent

UNITED STATES PATENTS

| | | |
|---|---|---|
| 1,771,982 | Mustin | July 29, 1930 |
| 1,841,432 | Clarke | Jan. 19, 1932 |
| 1,953,438 | Schlack | Apr. 3, 1934 |

OTHER REFERENCES

"Bakers' Helper," vol. 93, Issue No. 1169, May 13, 1950, pages 67–70.